Fig. 3.

Patented Dec. 2, 1941

2,264,942

UNITED STATES PATENT OFFICE

2,264,942
ROTATIVE WINGED AIRCRAFT

Agnew E. Larsen, Jenkintown, Pa., assignor to Autogiro Company of America, Willow Grove, Pa., a corporation of Delaware Application May 5, 1939, Serial No. 271,841

29 Claims. (Cl. 244—18)

This invention relates to aircraft of the type equipped with a bladed sustaining rotor, the invention being especially concerned with rotor hub or head structure and associated parts.

The invention has especial reference to the type of rotor providing freedom for flapping movement of the blades and freedom for tilting of the hub, in addition to the rotational movement thereof, the hub tilting movement being provided for control purposes in accordance with the disclosure of copending application of Juan de la Cierva, Serial No. 645,985, filed December 6, 1932.

In considering the objects of the invention, it is first noted that for various structural and aerodynamic reasons, the invention has in view disposition of the hub and blade mounting parts to provide a rotational axis, blade flapping axes and hub tilting axes, all intersecting at a common point or at least passing each other close to a centralized point in the hub.

Various of these more or less general objects are attained by novel structure including, among others, the following features:

For the purpose of providing intersecting rotational and hub tilting axes, the invention contemplates a hub structure in which a single bearing means accommodates both of these two motions of the hub. This involves the important advantage flowing from assignment of two functions to a single bearing mechanism, the result being reduction in total number of parts and devices. In accordance with the invention, the bearing means common to rotation and tilting are preferably of spherical form.

Another important feature of the invention is involved in the provision of blade mounting forks for the several blades which, when viewed in plan, are clustered or interleave with each other in a novel manner which permits the attainment of several important objects, such as pivoting of the individual blades on the hub for flapping movement about axes which not only intersect or pass close to the rotational axis, but which are also obliquely inclined with respect to the longitudinal blade axis, when viewed in plan. Additionally, this blade fork cluster permits employing a secondary inclination of the flapping axes, i. e., an inclination with respect to a plane perpendicular to the axis of the rotor.

The use of the novel blade fork cluster above mentioned also has the advantage of providing for connection of a plurality of blades (particularly three) to the hub while maintaining small overall dimensions of the hub. The compactness of the hub is further enhanced when employing the clustered forks in association with the spherical bearing means for mounting the rotative hub member, in accordance with which the flapping pivot parts themselves for the blades may be disposed very close to the rotational axis, notwithstanding the fact that the rotative hub is tiltable about a center lying on the rotational axis in or very close to the plane of the blade flapping axes. The manner in which the structure accomplishes these ends will appear more fully hereinafter.

Another object of the invention is the provision of driving means for the rotor including a drive shaft extended upwardly from the body of the machine to the rotor head and connected with the rotative hub member by gearing, which gearing is associated with parts of the hub which are fixed as against tilting movement, the drive shaft therefor not requiring flexible joints to accommodate such tilting movement, as has been necessary in certain prior structures.

A further important feature of the hub lies in the use of a driving connection between the gearing above referred to and the rotative hub member, which connection extends centrally through both the rotative and non-rotative axis members.

While not limited thereto, the invention also contemplates use of all of the foregoing features in the type of aircraft in which the sustaining rotor is normally aerodynamically rotated in flight, but in which the drive mechanism is employed for starting prior to take-off from the ground, and further in which the incidence or pitch setting of the baldes may be reduced to zero during driving to a high speed, preferably greater than that of normal flight, and then increased at the moment of take-off in order to utilize kinetic energy stored in the rotor to effect "direct" or substantially vertical take-off. This type of take-off is more fully disclosed in copending application of Juan de la Cierva, Serial No. 738,349, filed August 3, 1934. With this end in view, provision is made for adjustment of the pitch angles of the blades by rotation thereof substantially about their own longitudinal axes, a control or actuating mechanism being provided for pitch change, including a fluid pressure operating connection extended from the blade root inwardly to the top of the hub, and thence downwardly centrally through the hub members and the driving shaft therein. In accordance with another feature, the driving shaft is of hollow construction and employed as a portion of the fluid pressure connection for pitch control.

It is also pointed out that various structural features above achieve a number of important functional objects and advantages, including the following:

The provision of a hub tilting center which is actually physically centered in the hub and in or close to the horizontal plane of connection of the blades to the hub produces ease of control. The employment of a flapping pivot axis for each blade which is obliquely inclined with respect to the longitudinal blade axis when viewed in plan, making an acute angle with the longitudinal blade axis at the leading side of the latter, serves to reduce the variation of the coning angle in the circle of rotation of the blades during translational flight, and serves also to provide an increased pitch angle for direct take-off purposes. As to this latter advantage, it is noted that for direct take-off the rotor is preferably overspeeded, resulting in increased centrifugal force which causes the blades to maintain a smaller coning angle which, because of the obliquity of the flapping pivot is a position of increased pitch.

The secondary obliquity of the flapping pivot axis for each blade (the character of which will be described more fully hereinafter) reduces the component of lag or lead motion incident to flapping movement of the blade in the average coned position of flight.

How the foregoing objects and advantages are attained will appear more fully from the following description taken in connection with the accompanying drawings, which illustrate two hub forms. In the drawings—

Figure 1:
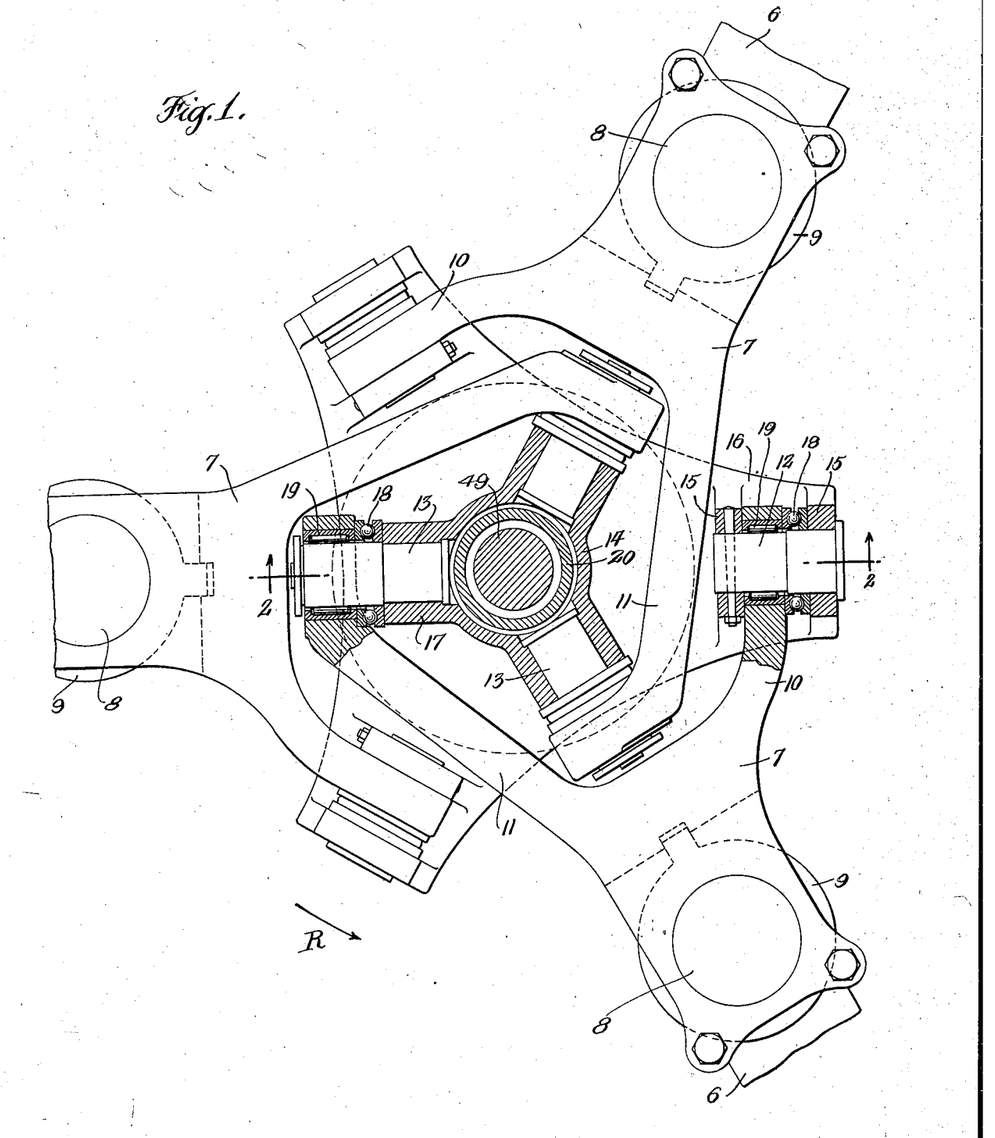
Figure 1 is a top view, partly in elevation and partly in horizontal section, on the line 1—1 of Figure 2, through one form of hub for a three bladed rotor.
Figure 2:
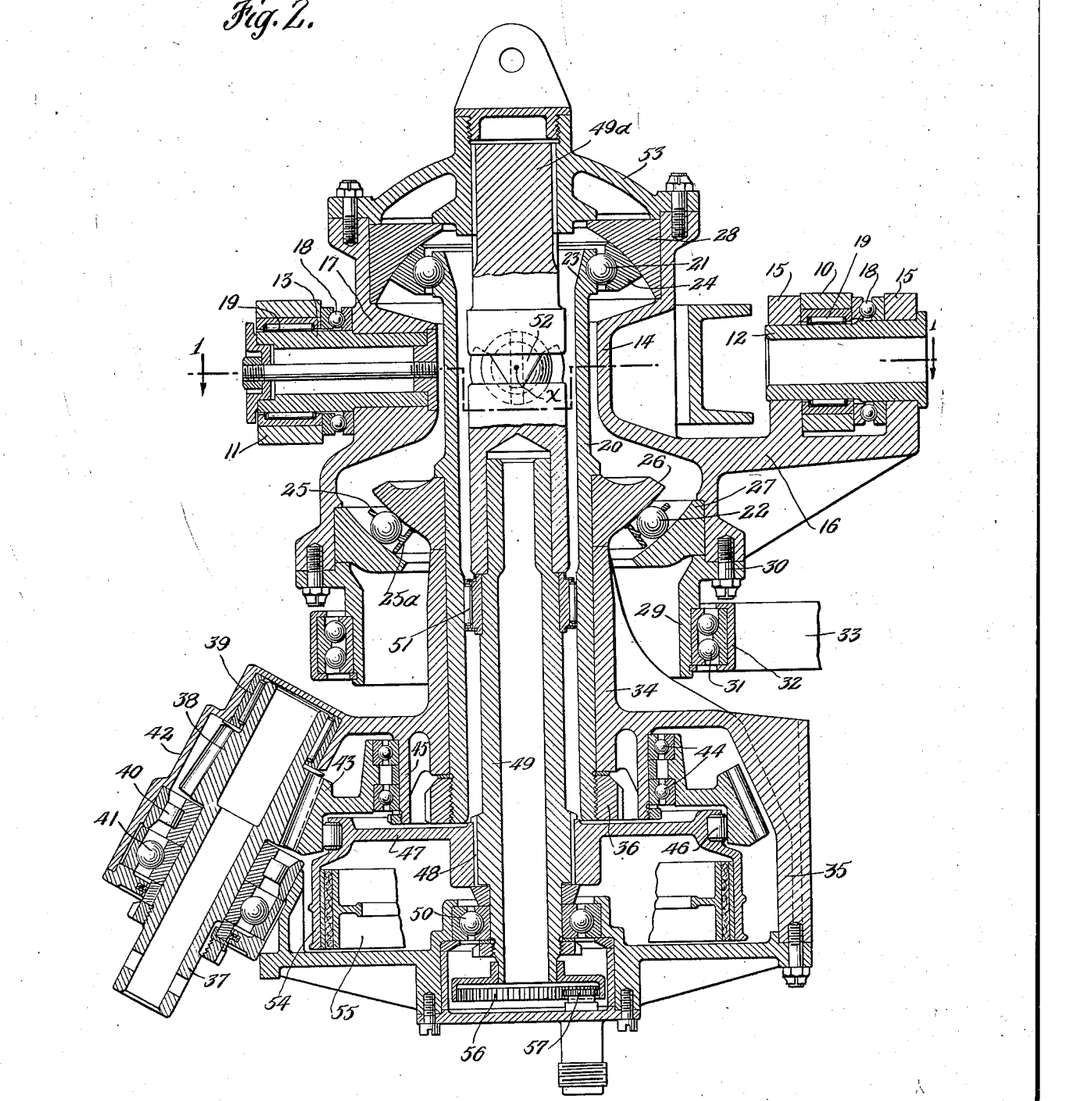
Figure 2 is a vertical sectional view through the hub of Figure 1, taken as indicated by the section line 2—2 on Figure 1.

Referring first to the form of rotor head shown in Figures 1 and 2, it will be seen that the hub here illustrated is arranged to cooperate with the blades of a three bladed rotor, the root ends of two of the blade spars appearing at 6. Each blade is connected with the hub by means of a fork or Y-shaped mounting member 7, the stem or base end of the mounting member being coupled to the blade spar by means of a drag pivot 8 providing freedom for fore and aft movement of the blade generally within its rotative path. If desired, a device for damping this movement, shown at 9, may be associated with the pivot 8. The details of this structure need not be considered herein, although it is noted that a damper of this type is fully disclosed and claimed in my copending application Serial No. 106,343, filed October 19, 1936, and issued April 25, 1939, as Patent No. 2,155,427.

The two prongs 10 and 11 of each fork are of different length and are extended to embrace the hub, being pivoted thereto by means of aligned pivots 12 and 13 providing a flapping pivot axis which, as shown in Figures 1 and 2, intersects the rotational axis of the hub in a plane perpendicular thereto. The axis of the flapping pivot 12—13, when viewed in plan, makes an acute angle with the longitudinal axis of the blade at the leading side of the latter, the direction of rotation being indicated in Figure 1 by the arrow R.

In Figures 1 and 2 the rotative hub member is indicated generally by the numeral 14. The pivot member 12 is carried by a pair of apertured upstanding lugs 15—15 formed on a bracket 16 projecting from the hub 14. The other pivot member 13 for each blade fork is mounted in a boss 17 formed on the rotative hub member. Because of the obliquity of the flapping pivot axis, there is a substantial end thrust which is transmitted from the forks 10 and 11 of the blade mounting member to the mounting parts for the pivots by means of thrust bearings 18. A needle roller bearing 19 is desirably interposed between each of the pivot members 12 and 13 and the associated apertured extremity of the prong 10 or 11 of the forked mounting member.

With further reference to the general arrangement of the blade mounting members, it will be noted from Figure 1 that, when viewed in plan, the several blade forks are clustered or interleaving, the longer prong 11 of each fork being extended to a point adjacent the base of an adjacent fork. While some variations are permissible, the arrangement of Figure 1 provides a flapping pivot axis for each blade, which axis is substantially coincident with the longitudinal axis of an adjacent blade. In this pattern, therefore, the pivot axis for each blade makes an angle of 60° with the longitudinal axis of that blade. Since the angle is acute at the leading side of the blade axis, flapping movement of the blade is accompanied by pitch change movement thereof in the sense providing for increase of blade pitch upon downward flapping movement, and decrease of blade pitch upon upward flapping movement. Various purposes for this will be mentioned more fully hereinafter.

Turning now more particularly to Figure 2, the rotative hub member 14 is mounted for rotation about the non-rotative hub supporting member 20, the bearings interposed between the two members 14 and 20 including two series of ball rollers 21 and 22, the former of which constitutes a radial bearing between the race parts 23 and 24. The series of balls 22 are mounted in a cage 25 and cooperate with a pair of complementary semi-spherical bearing races 26 and 27. The cage 25 preferably carries a grease seal as at 25a, so that the entire space between the stationary and rotative hub parts may be packed with lubricant.

The outer race 24 of the upper bearing is provided with a convex semi-spherical surface which cooperates with a complementary surface formed on the ring 28, the surfaces on the members 24 and 28 and also on the races 26 and 27 all being struck from a common center $x$ lying on the rotational axis and also in the plane of the flapping pivot axes for the several blades. This bearing arrangement provides freedom for rotation of the rotative hub member 14 and the blades secured thereto with respect to the non-rotative member 20. In addition, the spherical bearing surfaces provide freedom for tilting movement of the rotative hub member in all directions about the point of intersection of the flapping axes for the blades with the rotational axis of the hub (point $x$).

The division of the spherical bearing means into two portions lying, respectively, above and below a plane containing the flapping pivot axes, and the mounting of the pivot parts 13 for the several blades at a point between the two portions of the bearing close to the non-rotative hub member 20, results in material reduction in the overall diameter of the rotor head, notwithstanding the fact that an interleaving or clustered blade fork arrangement is employed.

As mentioned hereinabove in the statement of objects, the tilting movement of the rotative hub member is utilized to effect control of the craft in flight, in the general manner disclosed in copending application of Juan de la Cierva, Serial No. 645,985. For this purpose, a downward cylindrical extension 29 is secured to the lower end of the rotative hub member 14 as by studs 30. The part 29 carries a bearing 31, the outer race of which serves to support a ring 32 from which an arm 33 projects. The ring 32 and arm 33 do not rotate with the hub, but the arm is employed in a system of control connections by means of which the rotative hub member may be tilted. A pair of control arms extended from ring 32 at right angles to each other may be employed in order to effect tilting of the hub in all planes.

The lower end of the non-rotative hub spindle 20 is telescoped within a sleeve 34 formed as a part of a fixed casing and rotor head support 35. A ring 36 threaded on to the lower end of the fixed hub spindle 20 serves to rigidly interconnect the spindle with the support and also to properly position the inner spherical bearing race 26. The support 35 may be carried at the upper ends of structural members so as to properly position the rotor axis above the body of the craft.

As hereinabove indicated, the invention also contemplates a means for driving the rotor and, as shown in Figure 2, this means includes a shaft 37 adapted to be connected with a suitable prime mover, such as a propulsion engine in the body of the craft, and carrying a pinion 38 between the bearings 39 and 40—41, which bearings are housed in an extension 42 of the fixed support and casing structure 35. Pinion 38 meshes with a ring gear 43 journalled by means of bearings 44—44 which are mounted on a part 45 of the fixed housing structure 35. The ring gear 43 also has an inner cylindrical surface adapted to cooperate with the rolling elements 46 of an overrunning or freewheeling clutch, these elements riding in a peripheral groove formed in member 47, which is keyed as at 48 to a central drive shaft 49 extended upwardly through the hub and journalled at its lower end in the fixed casing structure by a bearing 50, and toward its upper end in the non-rotative hub supporting member 20 by a bearing 51. The uppermost portion 49a of the drive shaft is flexibly jointed with the lower portion by means of a universal 52, the center of which is coincident with the center of tilt of the rotative hub member on the spherical bearings. The portion 49a of the drive shaft is keyed or splined with the cap member 53 which surmounts and is fastened to the rotative hub member 14.

By the above mechanism, driving torque is transmitted to the rotative hub part by means of a shaft extended centrally through the hub structure, said shaft being jointed at the center of tilt so as to accommodate tilting movements in flight. It is especially to be noted in connection with this drive mechanism that mounting of the rotative hub member on spherical bearings providing also for tilting movement, enables the major portion of the drive mechanism, including the gearing, overrunning clutch, etc., to be mounted rigidly in a fixed support; which is in contrast with certain prior arrangements in which the mechanism providing for tilting of the hub was so disposed that the entire rotor head unit, including both the rotative and non-rotative hub parts, the driving gearing and associated parts, was obliged to move with the hub when tilted.

In the arrangement of Figures 1 and 2, a rotor brake is provided within the fixed mounting casing 35, this brake including the drum 54 rotatable with the disk 47 and, therefore, with the shaft 49, and one or more cooperating brake shoes 55 arranged internally of the drum 54.

A tachometer or rotor speed indicator may be coupled to the lower end of shaft 49 by means of internal gear 56 and pinion 57 adapted to actuate a connection extended to a tachometer in the body of the machine.

With regard to the form of hub structure illustrated in Figures 1 and 2, and also the form of Figures 3, 4 and 5 described hereinafter, attention is called to the fact that as to certain features thereof the present application is a continuation in part of my copending application Serial No. 204,283, filed April 26, 1938. Further attention is directed to the fact that certain features of the forms of hub structure just mentioned are also disclosed in my copending applications Serial Nos. 209,511, filed May 23, 1938, and 238,729, filed November 4, 1938, which later application issued as Patent No. 2,220,109, November 5, 1940.

Figure 3:
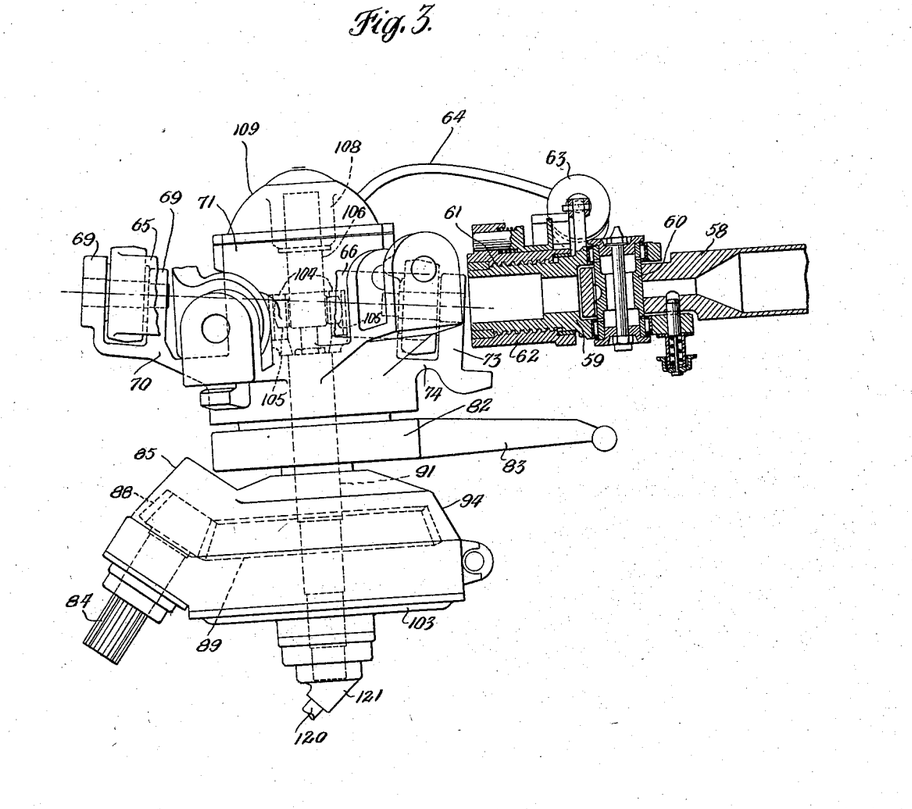
Figure 3 is a side elevational view of a second form of hub according to the invention, with certain parts omitted, broken away and shown in vertical section.

In Figure 3 the root end fitting of a blade spar appears at 58, this fitting being connected with the link 59 by means of the drag pivot 60, which may normally occupy a substantially vertical position, as shown in Figure 3, or which, if desired, may normally be positioned at a lateral inclination in the manner fully described in my copending application Serial No. 238,729 above referred to.

Figure 4:
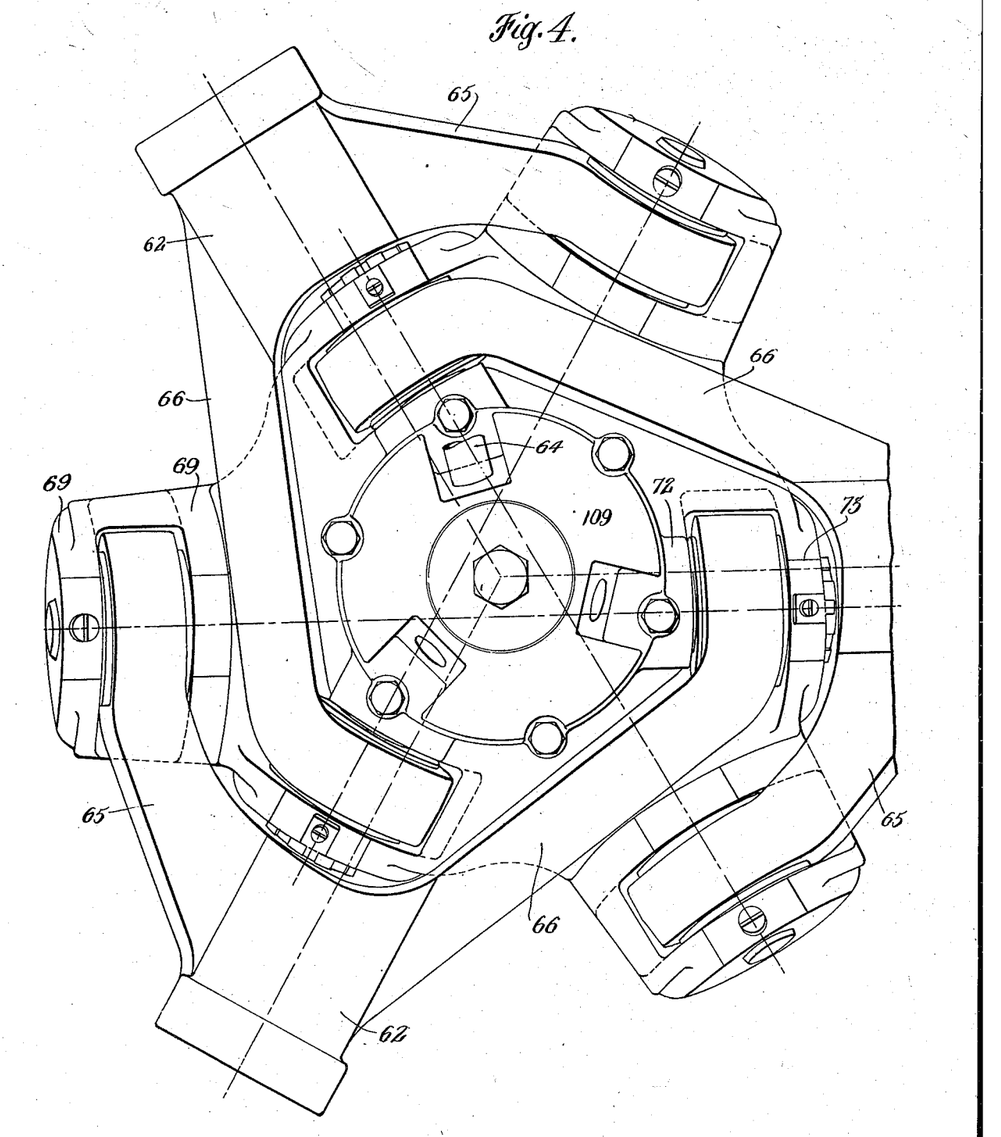
Figure 4 is an enlarged top plan view of the hub of Figure 3.

The link 59 is provided with a coarse external thread 61 intermeshing with a complementary internal thread on the sleeve 62, which sleeve, as seen in Figure 4, constitutes the base or stem of the fork or Y-shaped mounting member for the blade. By means of the threaded interconnection between parts 61 and 62, freedom is provided for movement of the blade substantially about its own longitudinal axis, in order to vary the pitch of the blade. A control mechanism is employed so as to change the blade pitch when desired, this mechanism, in the arrangement of Figure 3, including a fluid pressure piston and cylinder device 63, one portion of which is coupled to the member 59, and the other to the member 62, so as to effect relative rotation of these two parts and pitch change of the blade in the manner fully described in said application No. 238,729. The details of this mechanism need not be considered herein, although it should be noted that the fluid pressure connection 64 which is extended radially inwardly from the device 63 communicates with a connection extended downwardly through the center of the hub, as will be described more fully hereinafter. It may also be noted that, preferably, the interengaging threads of sleeves 61 and 62 are arranged so that the centrifugal force of rotation of the blade tends to rotate the blade about its axis in a direction to increase the pitch thereof, the admission of fluid pressure to cylinder 63 having the opposite effect. The above pitch control mechanism forms no part of the present invention per se, but is disclosed in copending application of James G. Ray, Serial No. 91,838, filed July 22, 1936, issued October 1, 1940, as Patent No. 2,216,163. Briefly, the mechanism may be employed for the purpose of effecting direct or substantially vertical take-off, by introducing fluid pressure through the connection 64, which results in reduction of blade pitch (preferably to zero), driving the rotor to a speed greater than that normally employed in flight, disconnecting the drive and then increasing the blade pitch under the influence of centrifugal force (accomplished by releasing the fluid pressure in connection 64).

Turning now to the showing of Figure 4, it will be seen that here again the rotor incorporates three blades, the mounting fork for each blade including prongs 65 and 66 extended to embrace the hub, but of different length so as to provide a clustered or interleaving pattern pattern generally similar to that discussed above in connection with Figure 1.

Figure 5:
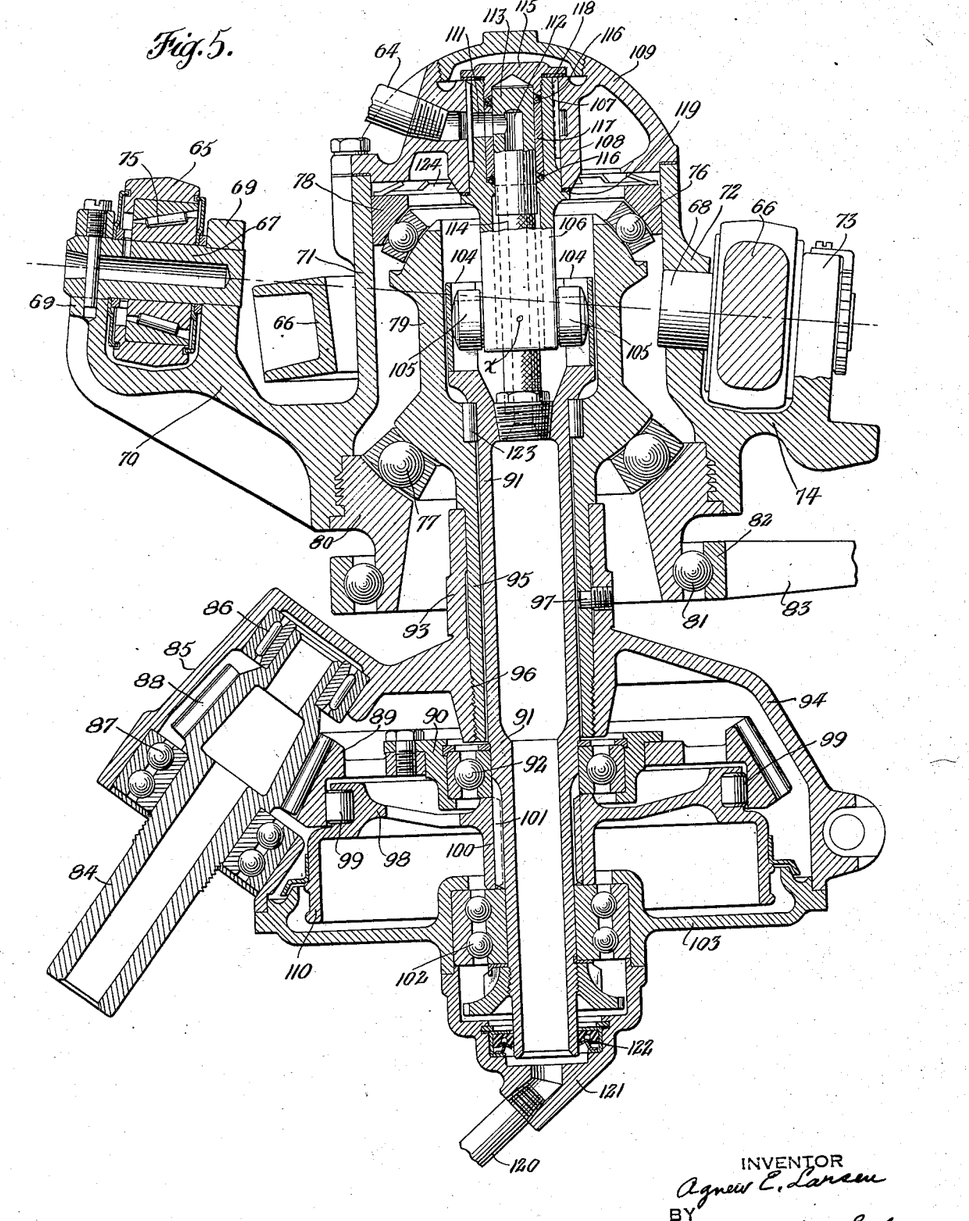
Figure 5 is a vertical sectional view of the hub of Figures 3 and 4, also on an enlarged scale.

As seen in Figure 5, the flapping pivot for each blade incorporates two aligned pivot parts 67 and 68, the former of which is fixed or mounted in a pair of apertured ears 69—69 which are carried by a bracket 70 projecting from the rotative hub part 71.

The other pivot pin 68 is carried at one end in a boss 72 formed on the rotative hub member relatively close to the axis of rotation and an apertured ear 73 carried by a short bracket 74 projecting from the rotative hub member. The inner ends of the two prongs of each blade fork are, of course, apertured to cooperate with the pivot pins 67 and 68 and, in each instance, a bearing is interposed, one of such bearings appearing toward the left of Figure 5 at 75 in the form of a tapered roller bearing taking both the thrust and the radial loads.

The rotative hub member 71 is mounted for rotation and tilting movement by means of two series of ball rollers 76 and 77 which run between pairs of cooperating semi-spherical concave and convex bearing surfaces. The concave surface for the upper bearing 76 is formed on a race member 78 mounted internally of the rotative hub 71. The convex surface for the upper bearing 76 is formed toward the upper end of the non-rotative hub spindle or support 79. The hub spindle 79 also has a convex semi-spherical bearing surface for the lower bearing 77, the complementary concave outer surface for which is formed on a part 80 in threaded engagement with the lower end of the rotative hub member 71.

As in the first embodiment described, this spherical bearing arrangement provides a center of tilt for the rotative hub part lying on the rotational axis (point x). For the purpose of effecting controlled tilting, a bearing 81 is interposed between the member 80 and a non-rotative ring 82, which latter carries one or more control arms 83 (see also Figure 3).

In the arrangement of Figures 3, 4 and 5, the drive mechanism includes a shaft 84 mounted in a fixed casing 85 by means of bearings 86 and 87 and carrying a pinion 88 meshing with ring gear 89 having a hub part 90 which is mounted on the central drive shaft 91, with an interposed bearing 92. The pinion housing 85 and also the sleeve 93 are formed rigid with the fixed support or casing 94, the sleeve 93 being adapted to receive the lower cylindrical part 95 of the non-rotative hub spindle 79. The part 95 is, in fact, threaded into the sleeve 93 toward its lower end, as indicated at 96, and the two parts are pinned together as at 97.

From the ring gear 89, the rotor driving torque is transmitted to the part 98 by means of roller elements 99 of an overrunning clutch, the part 98 having a peripheral groove to receive the clutch rollers and also having a central hub 100 which is splined or keyed to the central driving shaft 91 as indicated at 101.

The lower end of the shaft 91 is journalled by bearing 102 in the bottom closure member 103 for the fixed casing and supporting structure 94, and toward its upper end, shaft 91 is journalled within the non-rotative hub spindle 79 by means of bearing 123.

Toward its upper end the drive shaft 91 is provided with two opposed forks, one prong of each of which appears at 104. Rollers 105 are received between the prongs of the two forks, the rollers being journalled on spindles projecting from the upper part 106 of the drive shaft, which upper part is connected as by splined joint 107 with a central sleeve 108 formed as a part of the hub cap 109, the latter being connected with the rotative hub part 71. The forks 104 and rollers 105 constitute a joint in the drive connection, which joint affords freedom for universal movement, the parts being so positioned that the center of this universal movement coincides with the center of tilt of the rotative hub part on the spherical bearings 76 and 77.

A brake for the rotor is provided in this form in a manner smilar to that described above, the brake including a drum 110 adapted to cooperate with an internal expanding brake, not shown.

Referring again to the blade mounting illustrated toward the right of Figure 3, and particularly to the mounting of the blade with freedom for pitch change movement, attention is now called to the fact that the fluid pressure connection 64 for control of pitch is extended inwardly to the hub to communicate with a passage 111 in the parts 107 and 108 (see Figure 5). Passage 111, in turn, communicates with a central vertical passage 112 in cylindrical member 113, which is joined at its lower end to a flexible tube 114 extended downwardly in the upper portion 106 of the drive shaft. At its lower end, below the plane of the forks 104 and rollers 105, the flexible tube is coupled with the drive shaft 91 and communicates with the hollow interior of the drive shaft. To prevent fluid leakage adjacent to the cylindrical member 113 toward the top of the hub, a flanged cap 115 is provided and serves to tighten the packings 116—116 which are arranged at the upper and lower ends of the sleeve 117. The cap 115 also serves to tighten packings 118 and 119 which seal the space between the telescoped and splined parts 106 and 108. By means of these several packings leakage is prevented from between any of the concentric or telescoped sleeves at the upper end of the hub.

At the bottom of the hub a fluid pressure connection 120 is coupled with the fitting 121 having an internal passage in communication with the interior of the drive shaft 91. A packing 122 between the lower end of the drive shaft and the fitting 121 prevents leakage at this point.

The foregoing fluid pressure connections provide for delivery of pressure to the blade pitch controlling cylinders 63 by means of connections which extend centrally up through the entire hub structure, and even centrally through the rotor driving shaft which passes up through the hub. The drive shaft 91, it will be noted, is hollowed and is employed as a part of the fluid pressure connection. All of the joints in the fluid pressure system, with the exception of the packing 122 at the lower end of shaft 91, are located between parts which are not rotatable with respect to each other, in view of which pressure losses are reduced to a minimum.

In considering the operation and advantages of the two forms of hub described, it is first mentioned that both forms have in common a number of the advantages hereinbefore fully referred to which flow from the use of spherical bearing means in mounting the rotative hub member not only for rotation, but also for tilting movement. For instance, by this means two functions are assigned to a single bearing structure and, at the same time, the spherical bearing means provide a convenient and effective way in which to provide an axis or center of tilt which intersects or lies on the rotational axis.

The bearing structure just mentioned also effectively cooperates with the type of clustered blade mounting fork shown, so as to provide flapping pivot axes for the blades which also intersect or pass close to the rotational axis and the center of tilt.

The clustered fork arrangement and the disposition of the flapping pivot parts for the several blades is of distinct advantage in making possible reduction of overall diameter of the hub, notwithstanding the fact that the forks embrace the hub in order to provide flapping axes which intersect or come close to the rotor axis, and that the tilting center lies on the rotational axis in or substantially in the plane in which the flapping axes intersect the rotational axis. In connection with this feature, note that a center of tilt lying on the rotor axis is provided without employing the gimbal ring type of mounting surrounding the hub, as has been used in some prior constructions.

The foregoing features provide ease of control and also reduce transmission of undesired forces, vibrations and the like to the control system.

The clustered blade fork arrangement, when viewed in plan, of both forms of hub is of advantage in facilitating the use of flapping axes which not only intersect or pass close to the rotational axis, as mentioned above, but which are also obliquely inclined with respect to the longitudinal axes of the blades. This obliquity (in accordance with which the flapping pivot axis forms an acute angle with the longitudinal blade axis at the leading side of the latter) is, in its turn, of advantage since the accompanying decrease of blade pitch when the blade flaps up, and increase of blade pitch when the blade flaps down, serves to reduce the total range of flapping in normal translational flight, and serves also to provide a higher pitch angle when effecting direct take-off as described above, during which the rotor is driven to a speed higher than that normally utilized in autorotative flight, so that the higher than normal centrifugal force causes the blades to ride in a lower flapping position and, therefore, in a higher pitch position.

As to the clustered fork arrangement of both forms, the following important advantage should also be noted:—

Referring, for example, to Figure 1, it will be noted that the longer prong 11 of each fork diverges from the longitudinal blade axis at a smaller angle than does the shorter prong 10. This longer prong 11 is also substantially directly connected by means of the pivot means (13 in Figure 1) with the central generally cylindrical part of the hub. The shorter prong, on the other hand, is pivotally mounted on the radial extension or bracket 16 at a point sufficiently spaced from the hub axis to accommodate the longer prong 11 of the fork for an adjacent blade. Because of the obliquity of the flapping pivot axis and of the disposition of the forks, the longer prong 11 carries very much heavier loads than the shorter prong 10. Since the longer prong is connected with the hub closer to the axis thereof and substantially directly to the central generally cylindrical part, the heavy axial thrust and vertical shear pass directly to the central part of the hub at a point close to the hub mounting bearings. It is of substantial advantage to carry the greater portion of the total loads through the longer prong 11, since this prong diverges only to a small extent from the longitudinal axis of the blade.

In the arrangement of Figures 3, 4 and 5, attention is called to several further points of importance, as follows:

The flapping pivot axes, in addition to the obliquity when viewed in plan, also have an obliquity with respect to a plane perpendicular to the axis of the rotor, as clearly appears in Figure 5. This obliquity is upwardly at the leading edge of the blade. Because of this secondary obliquity, the path of flapping movement of the blade adjacent the mean position of coning is more nearly a true vertical flapping, this being of advantage since it reduces the lag and lead component of blade movement about the flapping axis.

In accordance with the invention, the secondary obliquity above referred to has a value bearing a certain relation to the angle of the flapping axis when viewed in plan. More specifically, for a flapping pivot axis making an acute angle of about 60° with the longitudinal axis of the blade at the leading side of the latter, the secondary obliquity should be about 7½° from a plane perpendicular to the axis of rotation. When arranged in this manner, the secondary obliquity has an advantage in addition to that brought out above, which advantage will be apparent from the following:

With a flapping pivot axis oblique when viewed in plan (for instance, 60° from the blade axis), as the blade flaps, aerodynamic forces are set up tending to cause the blade to lead and lag in its rotative path to an extent different from the actual lagging and leading component of motion introduced by virtue of the 60° angle between the pivot axis and the blade axis when viewed in plan. The secondary obliquity is preferably of such value that the flapping path of the blade approximates that which the aerodynamic lagging and leading forces tend to cause the blade to follow. As above indicated, for a flapping axis 60° from the blade axis when viewed in plan, the secondary obliquity should be in the neighborhood of 7½°.

In the arrangement of Figures 3, 4 and 5, the flapping axes for the several blades are also slightly offset from the rotational axis. This slight offset will clearly appear from examination of Figure 4, and serves to introduce a restoring force when the rotor hub is tilted for control purposes, this being accomplished substantially without impairing the ease of control desired.

From inspection of Figure 5 it will be seen that the axis of the flapping pivot for each blade is further slightly offset upwardly from the center of tilt $x$, this relationship also serving to improve the control characteristics.

It is here noted that certain features of the geometrical disposition and interaction of the flapping, drag and pitch change pivots of the form of hub shown in Figures 3 to 5 are described and claimed in my copending application Serial No. 359,677, filed October 4, 1940.

Thus, in accordance with the invention, the flapping pivot axes may either exactly intersect the rotational axis and the center of tilt or they may pass the rotational axis and the center of tilt in slightly offset relation. The flapping pivot axes may further have a simple obliquity (as in Figures 1 and 2) or a compound obliquity (as in Figures 3, 4 and 5), but with any of these modifications the major objectives of the invention are realized.

As to actual operation of the spherical bearings, the lower bearing in both forms carries the thrust of sustension in flight. In the arrangement of Figures 1 and 2, the upper bearing 21 serves only as a radial bearing. Further, since only a relatively light load is imposed on the upper bearing (the weight of the rotor when the machine is not air borne) and since, for the most part, the rotor is tilted only when in flight, it is feasible to employ for the upper part of the spherical bearing complementary semi-spherical convex and concave bearing surfaces in actual sliding contact with each other.

On the other hand, as seen in Figure 5, both the lower and the upper bearings 77 and 76 function as radial bearings, thrust bearings and as bearings providing freedom for tilt.

In both arrangements the upper bearing serves to transmit the weight of the rotor to the non-rotative hub spindle when the aircraft is on the ground. In the arrangement of Figure 5, the weight of the rotor is transmitted to the outer race 78 through a yielding or spring ring 124, thereby providing a cushioning action as against vibration set up, for instance, when the machine is being taxied on a rough field.

In considering the appended claims, it should be borne in mind that where the general location of various parts such as the blade forks and pivots referred to and also where various axes or centers are recited as being substantially or approximately coincident or intersecting, it is to be understood that both forms of hub disclosed are intended to be covered.

I claim:

1. In an aircraft having a bladed sustaining rotor, a rotor hub structure including a non-rotative hub supporting member, a hub member to which a blade of the rotor is connected, and spherical bearing means interposed between said members and providing freedom for rotation of the hub member with respect to the hub supporting member, said spherical bearing means further providing freedom for tilting of the hub member with respect to the hub supporting member.

2. In an aircraft having a bladed sustaining rotor, a rotor hub structure including a non-rotative hub supporting member, a hub member to which a blade of the rotor is connected, spherical bearing means interposed between said members and providing freedom for rotation of the hub member with respect to the hub supporting member and further providing freedom for tilting of the hub member with respect to the hub supporting member, and mechanism for controllably tilting the hub member including a non-rotative ring and a bearing interposed between the ring and the hub member and providing for free rotation of the hub member within the ring.

3. In an aircraft having a bladed sustaining rotor, a hub structure including an internal non-rotative member and an external rotative member to which a blade of the rotor is connected, and spherical bearing means interposed between said members and providing freedom for rotation of the hub member with respect to the hub supporting member, said spherical bearing means further providing freedom for tilting of the hub member with respect to the hub supporting member.

4. In an aircraft having a bladed sustaining rotor, a hub structure including an internal non-rotative member and an external rotative member to which a blade of the rotor is connected, spherical bearing means interposed between said members and providing freedom for rotation of the hub member with respect to the hub supporting member and further providing freedom for tilting of the hub member with respect to the hub supporting member, mechanism for driving the rotor including drive means extended upwardly through the hub supporting member and connected toward its upper end with the rotative hub member, and a flexible connection in said drive means accommodating tilting movement of the rotative hub member.

5. In an aircraft having a bladed sustaining rotor, a hub structure including an internal non-rotative member and an external rotative member to which a blade of the rotor is connected, spherical bearing means interposed between said members and providing freedom for rotation of the hub member with respect to the hub supporting member and further providing freedom for tilting of the hub member with respect to the hub supporting member, mechanism for driving the rotor including drive means extended upwardly through the hub supporting member and connected toward its upper end with the rotative hub member, and a flexible connection in the drive means centralized at the center of tilt of the rotative hub member to accommodate tilting movement of the hub member.

6. In an aircraft having a bladed sustaining rotor, a hub structure including an internal non-rotative member and an external rotative member to which a blade of the rotor is connected, spherical bearing means interposed between said members and providing freedom for rotation of the hub member with respect to the hub supporting member and further providing freedom for tilting of the hub member with respect to the hub supporting member, mechanism for driving the rotor including drive means extended upwardly through the hub supporting member and connected toward its upper end with the rotative hub member, a flexible connection in the drive means centralized at the center of tilt of the rotative hub member to accommodate tilting movement of the hub member, and means for changing the position of the blade with respect to the hub including an operating connection therefor extended through said drive means.

7. In an aircraft having a bladed sustaining rotor, a hub structure including an internal non-rotative member and an external rotative member to which a blade of the rotor is connected, spherical bearing means interposed between said members and providing freedom for rotation of the hub member with respect to the hub supporting member and further providing freedom for tilting of the hub member with respect to the hub supporting member, mechanism for driving the rotor including drive means extended upwardly through the hub supporting member and connected toward its upper end with the rotative hub member, a flexible connection in the drive means centralized at the center of tilt of the rotative hub member to accommodate tilting movement of the hub member, and means for changing the position of the blade with respect to the hub including an operating connection therefor extended through said drive means, said operating connection also incorporating flexible connection means accommodating tilting movement of the rotative hub member.

8. In an aircraft having a bladed sustaining rotor, a hub structure including an internal non-rotative member and an external rotative member to which a blade of the rotor is connected, spherical bearing means interposed between said members and providing freedom for rotation of the hub member with respect to the hub supporting member and further providing freedom for tilting of the hub member with respect to the hub supporting member, and mechanism for driving the rotor including a drive shaft extended upwardly through the hub supporting member and connected with the rotative hub member, the drive shaft incorporating a flexible connection centralized substantially at the center of tilt of the rotative hub member.

9. In an aircraft having a bladed sustaining rotor, a hub structure including an internal non-rotative member and an external rotative member to which a blade of the rotor is connected, spherical bearing means interposed between said members and providing freedom for rotation of the hub member with respect to the hub supporting member and further providing freedom for tilting of the hub member with respect to the hub supporting member, mechanism for driving the rotor including a drive shaft extended upwardly through the hub supporting member and connected with the rotative hub member, the drive shaft incorporating a flexible connection centralized substantially at the center of tilt of the rotative hub member, and means for changing the position of the blade with respect to the hub including fluid pressure control means therefor comprising a fluid pressure connection extended through said drive shaft, the fluid pressure connection being flexibly jointed substantially at the center of tilt of the rotative hub member.

10. In an aircraft having a bladed sustaining rotor, a rotor hub structure including a non-rotative hub supporting member, a rotative hub member to which a blade of the rotor is connected, spherical bearing means interposed between said members and providing freedom for rotation of the hub member with respect to the hub supporting member and further providing freedom for tilting of the hub member with respect to the hub supporting member, and pivot means for connecting a rotor blade to the rotative hub member including a pivot having its axis approximately intersecting the center of tilt of the rotative hub member.

11. In an aircraft having a bladed sustaining rotor, a rotor hub structure including a non-rotative hub supporting member, a rotative hub member to which a blade of the rotor is connected, spherical bearing means interposed between said members and providing freedom for rotation of the hub member with respect to the hub supporting member and further providing freedom for tilting of the hub member with respect to the hub supporting member, and pivot means for connecting a rotor blade to the rotative hub member including a flapping pivot axis substantially intersecting the center of tilt of the rotative hub member.

12. In an aircraft having a bladed sustaining rotor, a rotor hub structure including a non-rotative hub supporting member, a rotative hub member to which a blade of the rotor is connected, spherical bearing means interposed between said members and providing freedom for rotation of the hub member with respect to the hub supporting member and further providing freedom for tilting of the hub member with respect to the hub supporting member, and pivot means for connecting a rotor blade to the rotative hub member including a flapping pivot the axis of which passes the center of tilt of the rotative hub member slightly horizontally offset therefrom.

13. In an aircraft having a bladed sustaining rotor, a rotor hub structure including a non-rotative hub supporting member, a rotative hub member to which a blade of the rotor is connected, spherical bearing means interposed between said members and providing freedom for rotation of the hub member with respect to the hub supporting member and further providing freedom for tilting of the hub member with respect to the hub supporting member, and pivot means for connecting a rotor blade to the rotative hub member including a flapping pivot the axis of which passes the center of tilt of the rotative hub member slightly vertically offset above the center of tilt of the rotative hub member.

14. In an aircraft having a bladed sustaining rotor, a rotor hub structure including a non-rotative hub supporting member, a rotative hub member to which a blade of the rotor is connected, spherical bearing means interposed between said members and providing freedom for rotation of the hub member with respect to the hub supporting member and further providing freedom for tilting of the hub member with respect to the hub supporting member, and mechanism for connecting the rotor blade with the rotative hub including a blade mounting fork embracing the hub and pivoted thereto on an axis which, when viewed in plan, forms an acute angle with the longitudinal axis of the blade at the leading side of the latter, said pivot axis also passing through the hub at or close to the center of tilt of the rotative hub member.

15. In an aircraft having a bladed sustaining rotor, a rotor hub structure including a non-rotative hub supporting member, a rotative hub member to which a blade of the rotor is connected, spherical bearing means interposed between said members and providing freedom for rotation of the hub member with respect to the hub supporting member and further providing freedom for tilting of the hub member with respect to the hub supporting member, and mechanism for connecting the rotor blade with the rotative hub including a blade mounting fork embracing the hub and pivoted thereto on an axis which, when viewed in plan, forms an acute angle with the longitudinal axis of the blade at the leading side of the latter, and which is obliquely inclined upwardly with respect to a plane perpendicular to the rotor axis toward the leading edge of the blade, said pivot axis also passing through the hub at or close to the center of tilt of the rotative hub member.

16. In an aircraft having a bladed sustaining rotor, a rotor hub structure including a non-rotative hub supporting member, a hub member to which a blade of the rotor is connected, and spherical bearing means interposed between said members and comprising two semi-spherical bearing surfaces on the hub supporting member and two cooperating semi-spherical bearing surfaces on the rotative hub member, said surfaces being arranged in pairs one of which is disposed above and the other below the center of the spherical bearing means, and providing freedom for rotation of the hub member and for tilting thereof in all directions.

17. In an aircraft having a bladed sustaining rotor, a rotor hub structure including a non-rotative hub supporting member, a hub member to which a blade of the rotor is connected, spherical bearing means interposed between said members and comprising two semi-spherical bearing surfaces on the hub supporting member and two cooperating semi-spherical bearing surfaces on the rotative hub member, said surfaces being arranged in pairs one of which is disposed above and the other below the center of the spherical bearing means, and providing freedom for rotation of the hub member and for tilting thereof in all directions, and a series of bearing balls interposed between the surfaces of at least one of said pairs.

18. In an aircraft having a bladed sustaining rotor, a rotor hub structure including a non-rotative hub supporting member, a hub member to which a blade of the rotor is connected, and spherical bearing means interposed between said members and comprising an internal concave semi-spherical bearing surface on the rotative hub member, and a complementary convex semi-spherical bearing member journalled on the internal hub supporting member with freedom for rotation about the axis thereof.

19. In an aircraft having a bladed sustaining rotor, a hub structure including an internal non-rotative hub supporting member, an external rotative hub member, a flapping pivot connecting the blade with the rotative hub member, and spherical bearing means providing freedom for rotation of the hub member and for tilting movement thereof in all directions, the flapping pivot and the spherical bearing means being arranged to provide a flapping pivot axis and a rotational axis each intersecting the point about which the rotative hub member is tiltable.

20. In an aircraft having a three bladed sustaining rotor, a hub structure incorporating a rotative hub member, and mechanism for connecting the blades with the hub including for each blade a fork embracing the hub, the prongs of which fork are asymmetrical with respect to the longitudinal axis of the blade, and the prongs of the several forks being clustered in a pattern providing for serial overlap thereof when viewed in plan, flapping pivot means connecting the prongs of each fork with the hub, the axis of the flapping pivot for one blade being approximately coincident with the longitudinal axis of an adjacent blade, when viewed in plan, and which is obliquely inclined upwardly with respect to a plane perpendicular to the rotor axis toward the leading edge of the blade.

21. In an aircraft having a three bladed sustaining rotor incorporating a hub, mechanism for mounting the three blades on the hub including, for each blade, a generally Y-shaped mounting member one leg of which is shorter than the other and the two legs of which embrace the hub, the stem end of the member being connected with the blade, and the mounting members for the three blades being positioned so that when viewed in plan the longer leg of each Y extends between the legs of an adjacent Y, and pivot means connecting the legs of each Y to the hub including for each blade a flapping pivot axis obliquely inclined with respect to the longitudinal axis of the respective blade and making an acute angle with the longitudinal axis of the blade at the leading side of the latter, the pivot axis further being positioned so that when viewed in plan, it is coincident with or close to coincidence with the longitudinal axis of an adjacent blade.

22. In an aircraft having a bladed sustaining rotor, an internal non-rotative hub supporting member, an external rotative hub member, spherical bearing means between said members providing freedom for rotation of the hub and also for tilting thereof, the spherical bearing means including two pairs of complementary semi-spherical bearing surfaces, both pairs lying in approximately horizontal planes but spaced one above and the other below the center of tilt, and pivot means for connecting a blade to the rotative hub member including a pivot part lying approximately in the horizontal plane containing the center of tilt and projecting between said pairs of bearing surfaces.

23. In an aircraft having a bladed sustaining rotor, a rotor hub structure including a non-rotative hub supporting member, a rotative hub member to which a blade of the rotor is connected, and bearing means interposed between said members providing freedom for rotation of the hub member with respect to the supporting member, said bearing means further providing freedom for tilting of the hub member with respect to the hub supporting member.

24. In an aircraft having a bladed sustaining rotor, a hub structure including a non-rotative hub supporting member and a rotative hub member to which a blade of the rotor is connected, bearing means interposed between said members providing freedom for rotation of the hub member, said bearing means further providing for tilting of the hub member with respect to the hub supporting member, mechanism for driving the rotor including a hollowed drive shaft extended within the hub structure, and means for changing the position of the blade with respect to the hub including fluid pressure control means comprising a fluid pressure connection extended through the hub, at least a portion of which connection is constituted by said hollowed drive shaft.

25. In an aircraft having a bladed sustaining rotor, a hub structure including a non-rotative hub supporting member and a rotative hub member to which a blade of the rotor is connected, bearing means interposed between said members providing freedom for rotation of the hub member and for tilting of the hub member with respect to the hub supporting member, mechanism for driving the rotor including a hollowed drive shaft extended within the hub structure, and means for changing the position of the blade with respect to the hub including fluid pressure control means comprising a fluid pressure connection extended through the hub, at least a portion of which connection is constituted by said hollowed drive shaft, the drive shaft and the fluid pressure connection both being flexibly jointed substantially at the center of tilt of the rotative hub member.

26. In an aircraft having a bladed sustaining rotor, a hub structure including an internal non-rotative hub supporting member and an external rotative hub member journalled on the outside thereof and carrying a blade, means providing freedom for tilting of the rotative axis of the hub, mechanism for driving the rotor including drive means extended upwardly through the hub supporting member and connected toward its upper end with the rotative hub member above the center of tilt, and a flexible connection in said drive means accommodating tilting movement of the rotative hub member.

27. In an aircraft having a bladed sustaining rotor, a hub structure including a non-rotative hub supporting member, a rotative hub member to which a blade of the rotor is connected, and means mounting the rotative hub member on the hub supporting member and providing cushioned support of the former on the latter.

28. In an aircraft having a bladed sustaining rotor, a rotative hub, and mechanism for pivotally connecting a blade with the hub including a blade mounting fork the base end of which is connected with the blade and the prongs of which embrace the hub and are pivotally connected therewith, the two prongs being of different lengths and diverging from the longitudinal axis of the blade at different angles, and the longer prong diverging at the smaller angle and being pivotally connected with the hub in a position closer to the hub axis than the pivotal connection of the other prong to the hub.

29. In an aircraft having a bladed sustaining rotor, a rotative hub, and mechanism for pivotally connecting a blade with the hub including a blade mounting fork the base end of which is connected with the blade and the prongs of which embrace the hub and are of different length, pivot means connecting the prongs of the fork with the hub and providing a flapping pivot axis which is obliquely inclined with respect to the longitudinal blade axis when viewed in plan, the hub member having a central generally cylindrical part with which the pivot means for the longer fork substantially directly cooperates, and the hub means further having a radial extension from said central substantially cylindrical part with which extension the pivot means for the shorter fork cooperates.

AGNEW E. LARSEN.